United States Patent
Yasaki et al.

(10) Patent No.: US 8,856,554 B2
(45) Date of Patent: Oct. 7, 2014

(54) INFORMATION TERMINAL AND METHOD OF REDUCING INFORMATION LEAKAGE

(75) Inventors: Kouichi Yasaki, Kawasaki (JP); Hidenobu Ito, Kawasaki (JP); Yousuke Nakamura, Kawasaki (JP); Kazuaki Nimura, Kawasaki (JP); Zhaogong Guo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/407,929

(22) Filed: Feb. 29, 2012

(65) Prior Publication Data

US 2012/0254637 A1    Oct. 4, 2012

(30) Foreign Application Priority Data

Mar. 30, 2011    (JP) .................................. 2011-076809

(51) Int. Cl.
  G06F 11/30    (2006.01)
  G06F 21/80    (2013.01)
  G06F 1/26     (2006.01)
  G06F 21/88    (2013.01)

(52) U.S. Cl.
  CPC  *G06F 1/26* (2013.01); *G06F 21/80* (2013.01); *G06F 2221/2107* (2013.01); *G06F 2221/2143* (2013.01); *G06F 21/88* (2013.01)
  USPC .......................................... 713/193; 713/189

(58) Field of Classification Search
  CPC .. G06F 21/80; G06F 21/88; G06F 2221/2107
  USPC ............... 713/193, 300, 189, 340; 726/26–33
  See application file for complete search history.

(56) References Cited

U.S. PATENT DOCUMENTS

| | | | |
|---|---|---|---|
| 7,953,987 B2* | 5/2011 | Buscaglia et al. | 713/194 |
| 8,116,599 B2* | 2/2012 | Iwakiri et al. | 382/313 |
| 2004/0025053 A1 | 2/2004 | Hayward | |
| 2006/0224902 A1* | 10/2006 | Bolt | 713/193 |
| 2009/0161162 A1* | 6/2009 | Ishii | 358/1.16 |
| 2009/0231691 A1* | 9/2009 | Watanabe | 359/383 |
| 2009/0278806 A1* | 11/2009 | Duarte et al. | 345/173 |
| 2011/0010565 A1* | 1/2011 | Tomii et al. | 713/194 |

FOREIGN PATENT DOCUMENTS

| | | |
|---|---|---|
| JP | 09-114746 | 5/1997 |
| JP | 2002-189635 | 7/2002 |
| JP | 2004-506258 | 2/2004 |
| JP | 2004-280551 | 10/2004 |
| JP | 2006-155527 | 6/2006 |
| JP | 2007-156599 | 6/2007 |
| JP | 2009-258979 | 11/2009 |
| WO | WO 02/12985 | 2/2002 |

OTHER PUBLICATIONS

Heddings, Lowell, "Manage the Delete Confirmation Dialog box in Windows 7", Dec. 3, 2009.*

* cited by examiner

*Primary Examiner* — Phuoc Nguyen
*Assistant Examiner* — Davoud Zand
(74) *Attorney, Agent, or Firm* — Staas & Halsey LLP (57) ABSTRACT

An information terminal includes: a storage unit to store information; a data encryption unit to encrypt the information and decrypt the encrypted information using an encryption key; a pre-deletion unit to delete the encryption key; a signal detection unit to detect an interruption signal; a pre-deletion setting unit to instruct the pre-deletion unit to delete the encryption key in response to the detection of the interruption signal; and a deletion stop unit to stop deletion of the encryption key by the pre-deletion unit.

15 Claims, 8 Drawing Sheets

INFORMATION TERMINAL AND METHOD OF REDUCING INFORMATION LEAKAGE

CROSS-REFERENCE TO RELATED APPLICATION(S)

This application is based upon and claims the benefit of priority of the prior Japanese Patent Application No. 2011-76809, filed on Mar. 30, 2011, the entire contents of which are incorporated herein by reference.

FIELD

The embodiments discussed herein are related to an information terminal that reduces information leakage from a storage device, and a method of reducing information leakage.

BACKGROUND

A mobile or portable information terminal capable of being carried around, for example a personal computer, includes a storage device for storing data, such as a hard disk drive (HDD), and a semiconductor memory device.

Related art is disclosed in Japanese Laid-open Patent Publication Nos. 2006-15527, 2009-258979, 2004-280551, 2002-189635, 9-114746, 2007-156599, and Japanese National Publication of International Patent Application No. 2004-506258.

SUMMARY

According to an aspect of the invention, an information terminal includes: a storage unit to store information; a data encryption unit to encrypt the information and decrypt the encrypted information using an encryption key; a pre-deletion unit to delete the encryption key; a signal detection unit to detect an interruption signal; a pre-deletion setting unit to instruct the pre-deletion unit to delete the encryption key in response to the detection of the interruption signal; and a deletion stop unit to stop deletion of the encryption key by the pre-deletion unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In an information terminal with a communication function, when the information terminal is stolen or lost, data deletion of the information terminal and report output may be carried out remotely. Data deletion is carried out by deleting an encryption key that encrypts data. Encryption systems that support an encryption key may be divided into two groups.

Figure 1A:
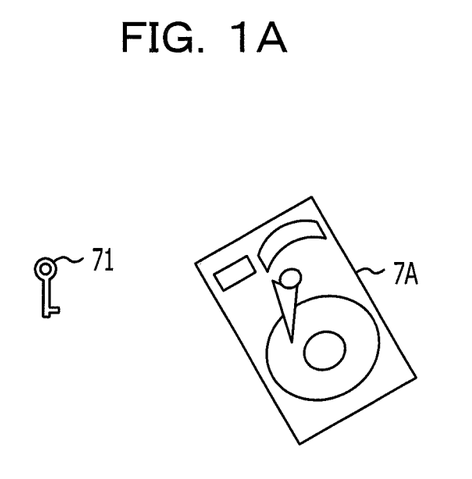
FIG. 1A and FIG. 1B illustrate exemplary encryption systems, respectively.
Figure 1B:
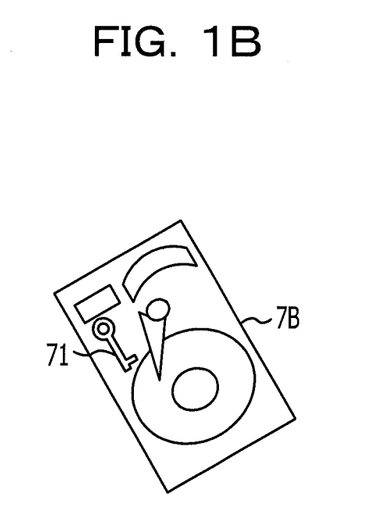

FIG. 1A and FIG. 1B illustrate an exemplary encryption system. A first encryption system illustrated in FIG. 1A may be a software encryption system. An encryption key 71 of the software encryption system is protected by a user password, etc. A storage place of the encryption key 71 is an HDD 7A or a security chip, which are accessible from the outside, and is managed separately from data to be encrypted.

The encryption system illustrated in FIG. 1B may be a hardware encryption system (SED: Self Encrypting Drive). An encryption key 71 in the hardware encryption system is protected by a user password. A storage place of the encryption key 71 is inside the HDD 7B that is not allowed to be accessed from the outside, and is managed together with the HDD 7B.

In the hardware encryption system (SED), if the HDD is removed before an encryption-key deletion instruction arrives by a remote operation, the encryption key may not be deleted.

Figure 2:
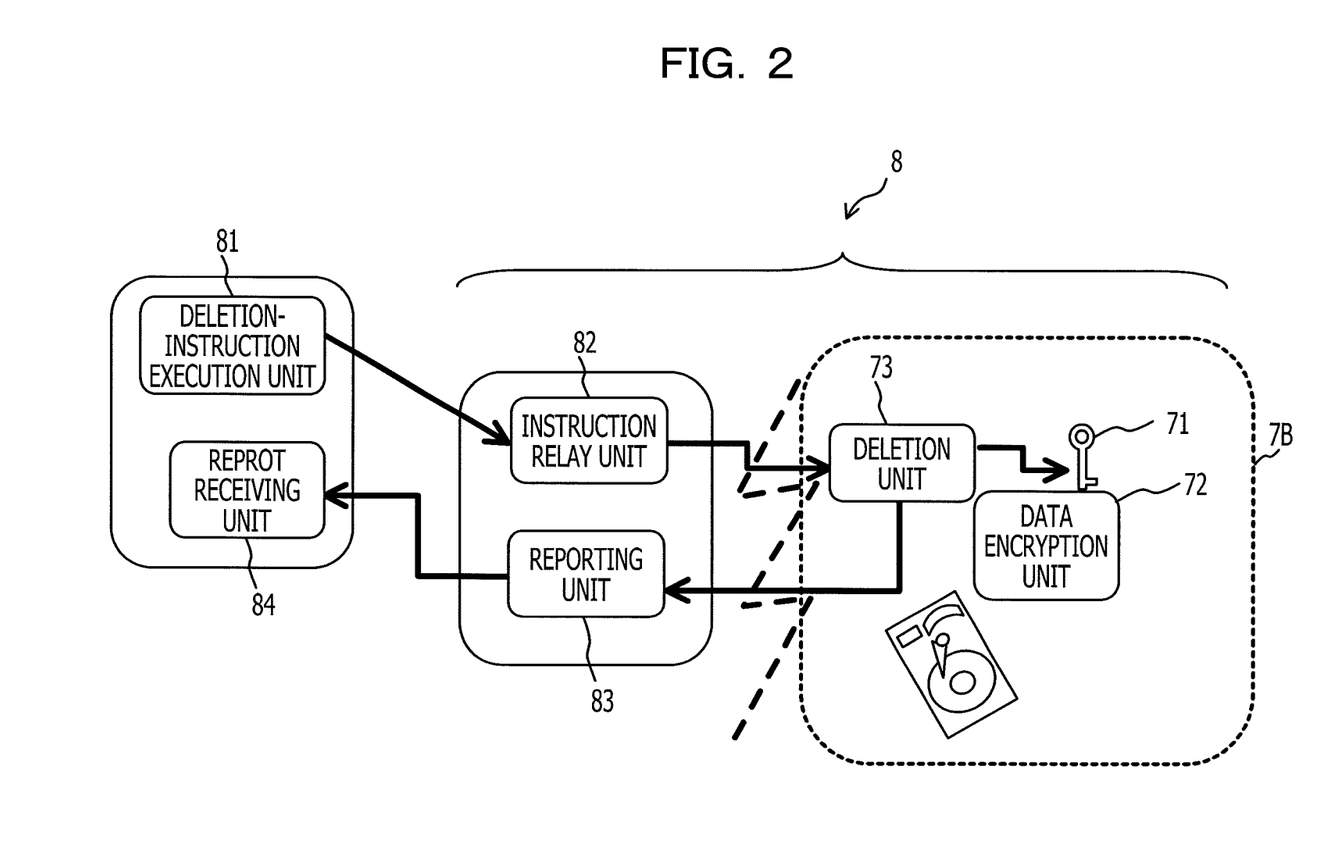
FIG. 2 illustrates an exemplary hardware encryption system.

FIG. 2 illustrates an exemplary hardware encryption system. In an information terminal 8 illustrated in FIG. 2, a data encryption unit 72 performs encryption and decryption of data on the HDD 7B using the encryption key 71 managed in the HDD 7B.

When the information terminal 8 is stolen or left behind, a user gives an instruction of data deletion to a deletion-instruction execution unit 81. The deletion-instruction execution unit 81 transfers the deletion instruction to a deletion unit 73 in the HDD 7B through the instruction relay unit 82. The deletion unit 73 deletes the encryption key 71.

When the deletion unit 73 deletes the encryption key 71, the reporting unit 83 notifies the report receiving unit 84 that the encryption key 71 has been deleted. When the HDD 7B is removed from the information terminal 8 before the instruction relay unit 82 transfers the deletion instruction to the deletion unit 73, the encryption key 71 may not be deleted.

Figure 3:
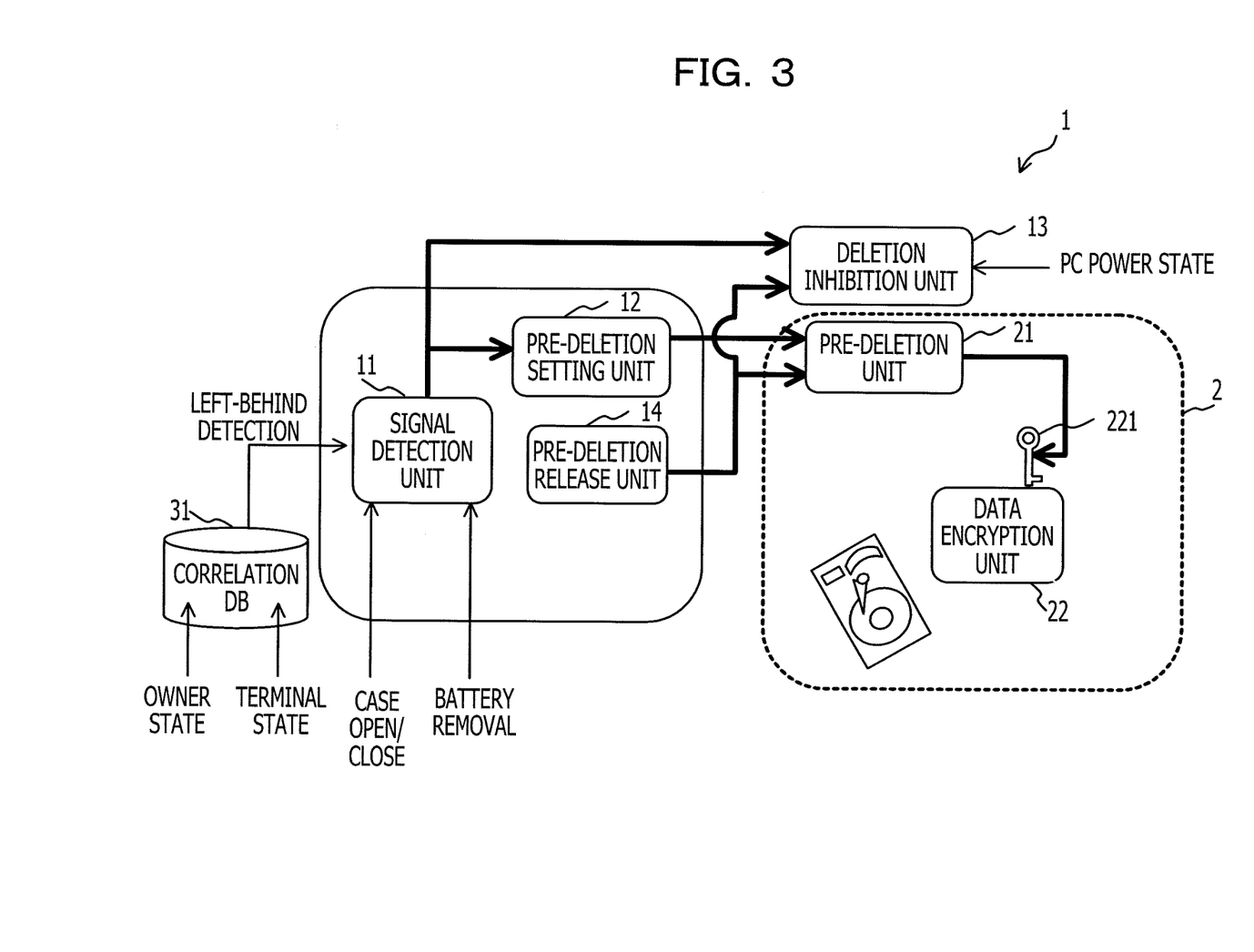
FIG. 3 illustrates an exemplary information terminal.

FIG. 3 illustrates an exemplary information terminal. In FIG. 3, an information terminal 1 includes a hard disk drive (HDD) 2 as a storage unit for storing data. The information terminal 1 may be a mobile or portable information terminal capable of being carried around, for example, a personal computer, etc. The HDD2 may store data including confidential information. The HDD 2 may store encrypted data. The HDD 2 has a data encryption unit 22 that decrypts the encrypted data based on the encryption key, and a pre-deletion unit 21 that deletes the encryption key when removed from the information terminal 1. The information terminal 1 includes a signal detection unit 11, a pre-deletion setting unit 12, a deletion stop unit 13, and a pre-deletion release unit 14.

The signal detection unit 11 detects an interruption signal indicating the possibility that the HDD 2 will be removed in an unauthorized way. For example, the signal detection unit 11 includes a determination table in which an interruption signal is set in order to determine that the HDD2 is removed in an unauthorized way. An unauthorized action may be detected based on whether an input interruption signal is stored in the determination table or not. The signal detection unit 11 may detect a possibility that the HDD 2 will be removed in an unauthorized way when a sensor detects that a case of the HDD 2 is opened. The signal detection unit 11 detects a possibility that the HDD 2 will be removed in an unauthorized way when detecting removal of a main power unit (main battery) included in the information terminal 1. A determination of whether the detection is correct or not may be made by a server capable of communicating with the information terminal 1.

The signal detection unit 11 determines that the information terminal 1 is located outside a given area (not located in a given area), and that a distance between the information terminal 1 and a certain device, for example a mobile phone, etc., held by the user becomes greater or equal a given value so that the signal detection unit 11 detects a possibility that the HDD 2 will be removed in an unauthorized way. For example, the signal detection unit 11 determines whether the information terminal 1 is located in a given area, for example, in a company, etc. The signal detection unit 11 detects the location information of the mobile phone, etc., and the location information of the information terminal 1, and calculates a distance between the information terminal 1 and the mobile phone. The signal detection unit 11 may refer to a correlation database (DB) 31 storing information indicating that the information terminal 1 is left behind, and may detect that the mobile phone, etc., is not located in a given area, and the distance between the information terminal 1 and the mobile phone is the given value or more.

The pre-deletion setting unit 12 detects an interruption signal from the signal detection unit 11, and issues a pre-deletion command for performing pre-deletion to the pre-deletion unit 21. Based on the issue of the pre-deletion command, the pre-deletion unit 21 sets the HDD 2 in order to move to an encryption key 221 for decrypting the encrypted information by the data encryption unit 22 from a nonvolatile storage area of the HDD 2 to a volatile storage area. The pre-deletion unit 21 moves the encryption key 221 from the nonvolatile storage area of the HDD 2 to the volatile storage area to set a pre-deletion state.

The deletion stop unit 13 supplies a stop signal for stopping deletion of the encryption key 221 by the pre-deletion unit 21 because of power shutdown to the HDD 2 based on the removal of the HDD 2 as a result of the setting by the pre-deletion setting unit 12 to the HDD 2.

The pre-deletion release unit 14 returns the encryption key 221 from the volatile storage area of the HDD 2 to the nonvolatile storage area based on an instruction from the user to release the pre-deletion state.

When the information terminal 1 detects the possibility that the HDD 2 will be removed in an unauthorized way, the information terminal 1 moves the encryption key 221 for decrypting confidential information from the nonvolatile storage area of the HDD2 to the volatile storage area. Accordingly, if the HDD 2 is removed in an unauthorized way and power supply to the HDD 2 is shut off, the encryption key 221 is deleted. Data leakage of confidential information is reduced. After the encryption key 221 is moved from the nonvolatile storage area of the HDD 2 to the volatile storage area, the power is supplied to the HDD 2, and thus even if the information terminal 1 is in a standby state or in a pause state, the encryption key 221 may not be deleted.

For example, when a main battery is replaced by the user, the encryption key 221 is returned from the volatile storage area of the HDD2 to the nonvolatile storage area based on an instruction from the user. Accordingly, if the HDD 2 is removed and the power supply to the HDD2 is shut off, the encryption key 221 may not be deleted.

The deletion may mean that the volatile storage area becomes undefined by shutoff of the power supply. By deletion of the encryption key 221 stored in the nonvolatile storage area, the encryption key 221 may become unable to be read from the nonvolatile storage area. For example, the data area in which the encryption key 221 is stored may be replaced with "0", or may be replaced with "1". The data area may be replaced randomly with "0" and "1". All of the area in which the encryption key 221 is stored may be rewritten, or a predefined certain data area may be rewritten, or only a certain data area randomly selected may be rewritten.

The encryption key 221 may be deleted by the number of power-ons to the information terminal 1 in place of deletion of the encryption key 221 when the power supply to the HDD 2 is shut off as a result of moving the encryption key 221 from the nonvolatile storage area to the volatile storage area. The encryption key 221 may be deleted by the number of failures in releasing by the pre-deletion release unit 14. The encryption key 221 may be deleted by the passage of time from adjustment of power supply to the volatile storage area. The conditions for the above-described deletion may be selected according to a level of unauthorized incident.

Figure 4:
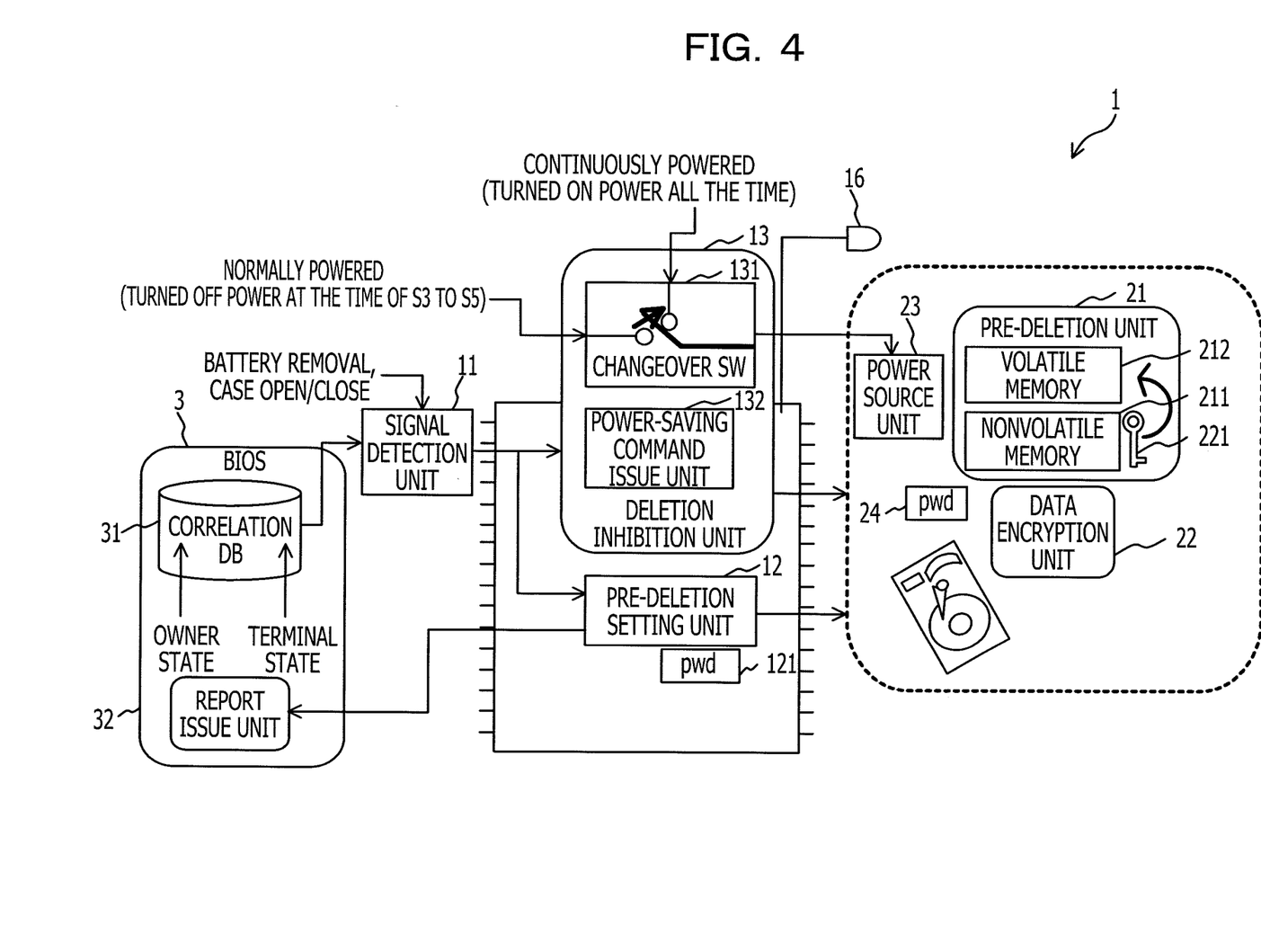
FIG. 4 illustrates an exemplary information terminal.

FIG. 4 illustrates an exemplary information terminal. The information terminal illustrated in FIG. 4 may have an information-leakage reduction function. In FIG. 4, a deletion stop unit 13 and a pre-deletion unit 21 are illustrated.

The deletion stop unit 13 includes a changeover switch (SW) 131 and a power-saving command issue unit 132. If the signal detection unit 11 detects, for example, the possibility that the HDD 2 is removed in an unauthorized way, the pre-deletion setting unit 12 compares a password (pwd) 121 and a password (pwd) 24 included in the HDD 2, and issues a pre-deletion command to the pre-deletion unit 21. The HDD 2 is set such that the encryption key 221 is moved from a nonvolatile memory 211, which is a nonvolatile storage area, of the HDD 2, to a volatile memory 212, which is a volatile storage area, based on the issue of the pre-deletion command. The changeover SW 131 is changed from a normally-powered state to a continuously-powered state. The normally-powered state may include S3 to S5 states, defined by a sleep state of the power-saving standard "Advanced Configuration and Power Interface (ACPI)". In the ACPI, S0 denotes a fully working state. S1 denotes a low-power-consumption state (both the processor and the chip sets are powered on). S2 denotes a low-power-consumption state (both the processor and the cache are powered off, and the chip set is powered on). S3 denotes a standby state. S4 denotes a suspend state. S5 denotes a power-off state by software.

The power-saving command issue unit 132 issues a power-saving command to the HDD 2 in order to set the HDD 2 to a power save mode as a result of the change by the changeover SW 131. Power supply to the HDD 2 is maintained in order to stop the encryption key 221 that is moved to the volatile memory 212 from being deleted.

In a state in which power is continuously supplied to the power source unit 23 of the HDD 2 based on the changeover SW 131, the pre-deletion unit 21 moves the encryption key 221 from the nonvolatile memory 211 of the HDD 2 to the volatile memory 212.

The information terminal 1 further includes a warning display unit 16 and a report issue unit 32. The warning display unit 16 warns or informs the user of setting of a pre-deletion state of the HDD 2 based on the pre-deletion command issued from the pre-deletion setting unit 12 to the pre-deletion unit 21 or release of a pre-deletion state of by the pre-deletion release unit 14. For example, an LED (Light Emitting Diode) may be turned on in red or may start blinking in red in a pre-deletion state. When the pre-deletion state is released, the LED may be turned in blue. In place of turning the LED on, the user may be informed of the state using short-range wireless communication, for example, Bluetooth (a registered trademark), etc.

Figure 5:
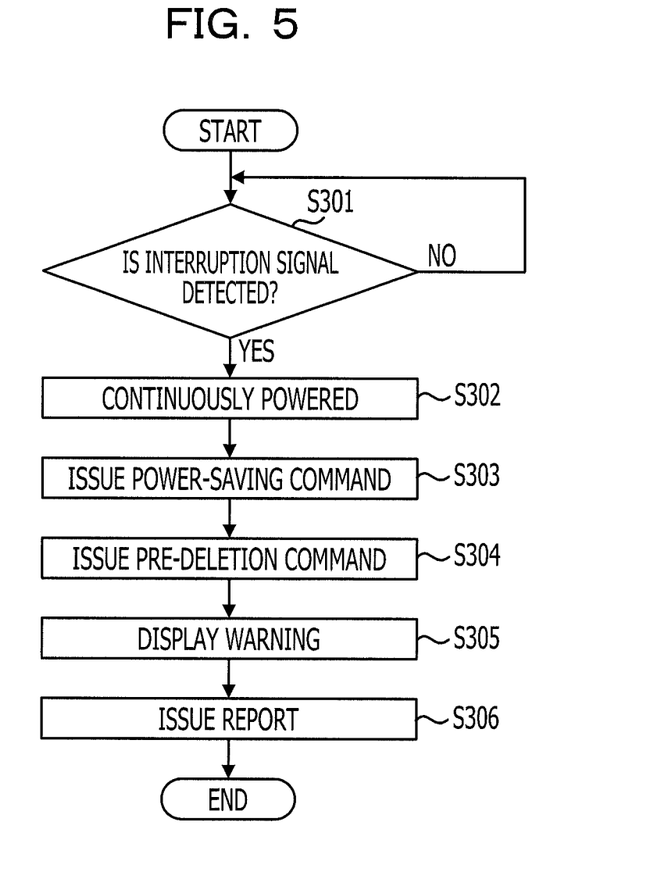
FIG. 5 illustrates an exemplary information-leakage stopping process.

The report issue unit 32 included in a BIOS (Basic Input/Output System) 3 issues a report, to the server, on setting of a pre-deletion state of the HDD 2 based on the pre-deletion command issued from the pre-deletion setting unit 12 to the pre-deletion unit 21, or release of a pre-deletion state of by the pre-deletion release unit 14. FIG. 5 illustrates an exemplary information-leakage stopping process.

First, in an operation S301, the signal detection unit 11 detects an interruption signal for determining the possibility that the HDD 2 will be removed in an unauthorized way. When the interruption signal is detected (the operation S301: Yes), in an operation S302, the changeover SW 131 changes a normally-powered state to a continuously-powered state. In an operation S303, the power-saving command issue unit 132 issues a power saving command for changing the HDD 2 to the power save mode to the HDD 2.

In an operation S304, the pre-deletion setting unit 12 issues a pre-deletion command to the pre-deletion unit 21. In an operation S305, the warning display unit 16 warns the user of setting of the HDD 2 to a pre-deletion state, or of release of a pre-deletion state by the pre-deletion release unit 14, and in an operation S306, the report issue unit 32 issues a report to the server.

Figure 6:
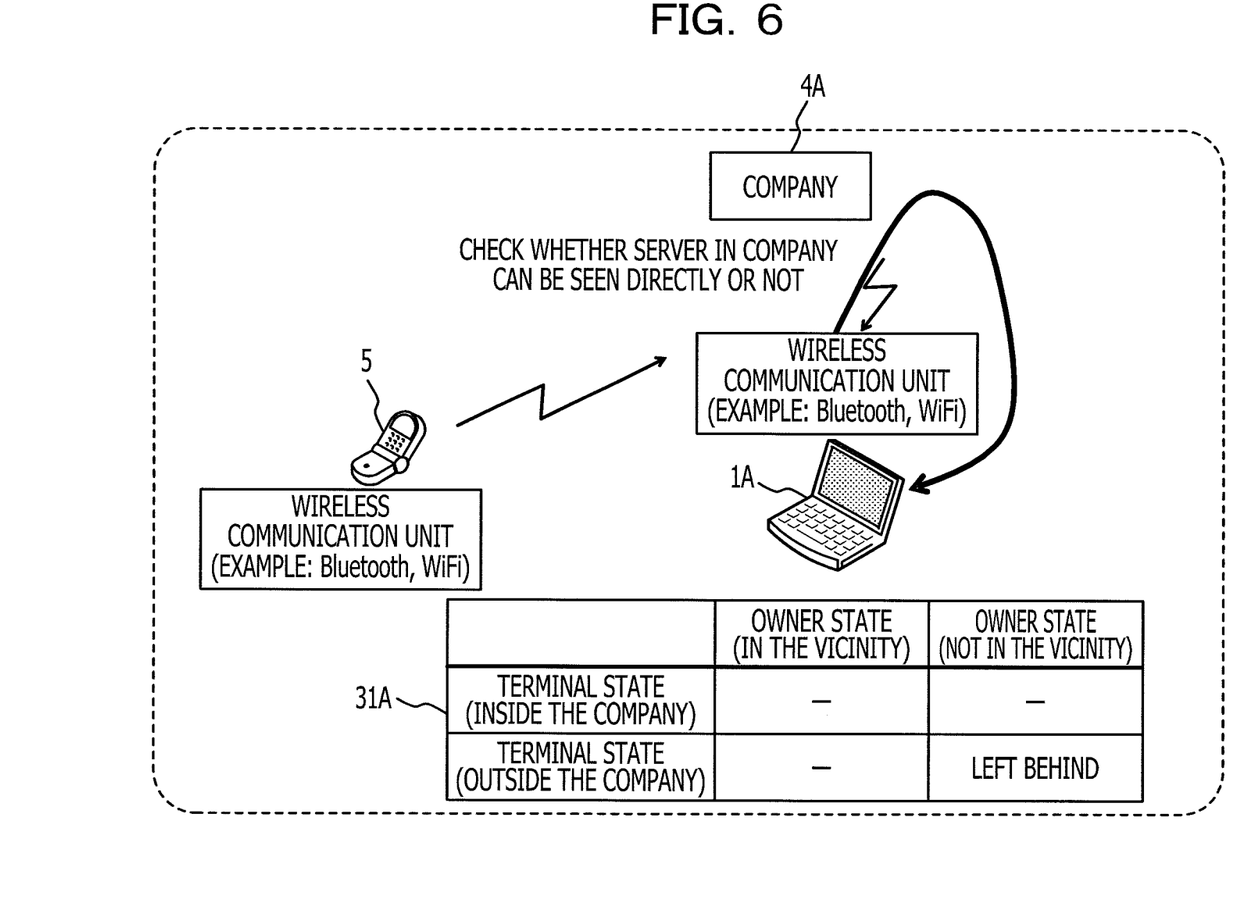
FIG. 6 illustrates an exemplary system.

FIG. 6 illustrates an exemplary a system. In the system illustrated in FIG. 6, an information terminal may include a correlation DB. An information terminal 1A may include a signal detection unit 11. The signal detection unit 11 detects that the information terminal 1A is located outside a given area, for example a company, etc., and that a mobile device held by the user, for example, a certain device like a mobile phone 5, etc., and the information terminal 1A are away from a certain device by a given distance or more based on the interruption signal. For example, the possibility that the information terminal 1A is left behind, and the HDD 2 is removed in an unauthorized way is detected.

For example, the mobile device 5 obtains location information of the mobile device 5 itself using a Global Positioning System (GPS) function. The information terminal 1A may be determined to be located in a company when the information terminal 1A is able to access the server 4A of the company to which the user belongs by communication of a wireless communication unit using Bluetooth (registered trademark), or WiFi (registered trademark), etc. The distance between the mobile device 5 and the information terminal 1A is calculated based on the location information. The distance may include information of whether or not the mobile device 5 and the information terminal 1A is away by a given value or more. Whether the information terminal 1A and the mobile device 5 are away by a given value or more may be determined based on whether the wireless communication unit of the information terminal 1A is allowed to perform communication with the wireless communication unit of the mobile device 5 using Bluetooth (registered trademark) or WiFi (registered trademark), etc.

When the information terminal 1A refers to a correlation DB 31A, which is included in the information terminal 1A, and stores left-behind information of the information terminal 1A, and detects that the mobile device 5, etc., is not located in a given area, and the distance between the information terminal 1A and the mobile device 5 is a given value or more, the information terminal 1A may detect the possibility that the HDD 2 is removed in an unauthorized way.

Figure 7:
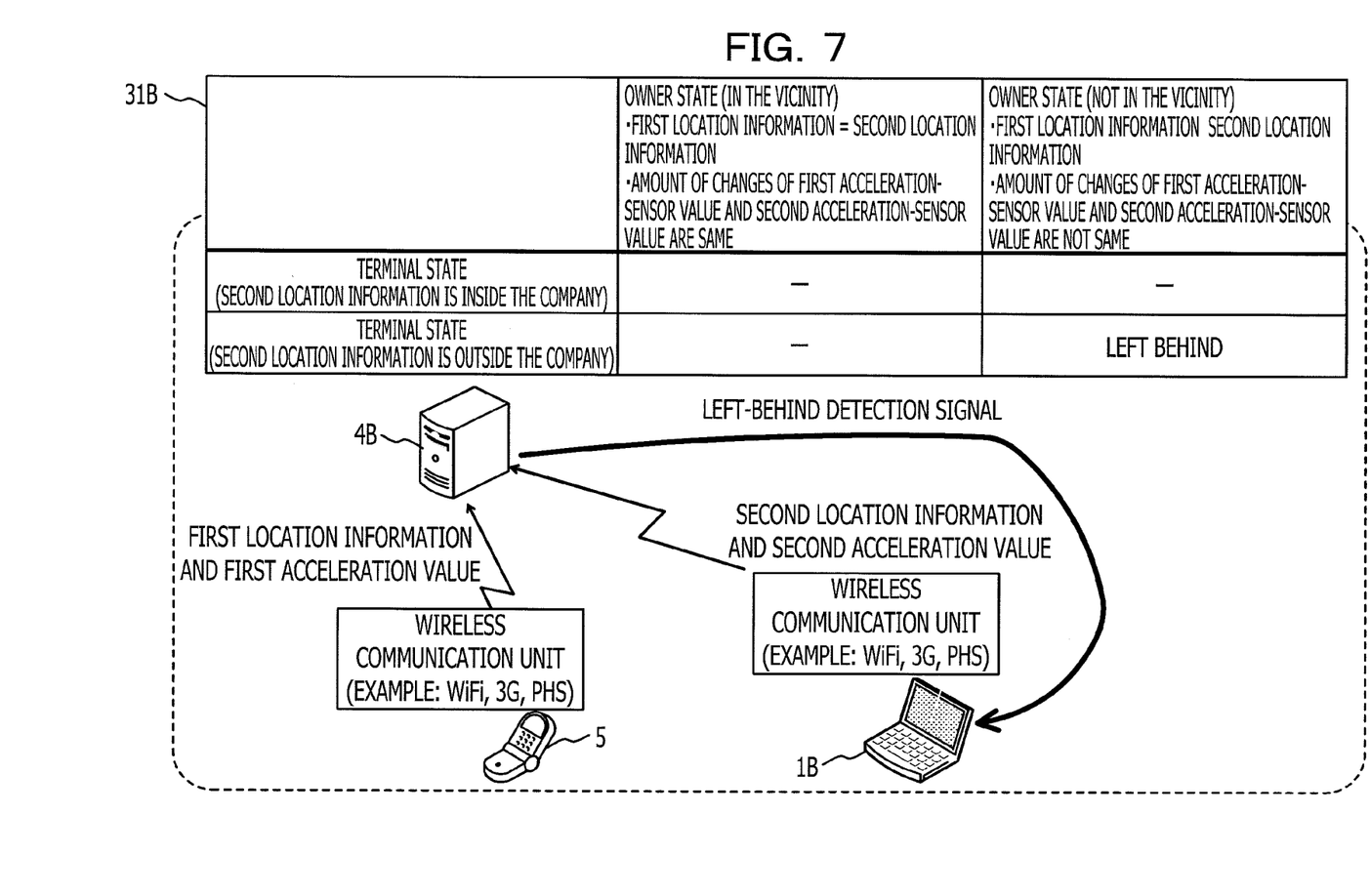
FIG. 7 illustrates an exemplary system.

FIG. 7 illustrates an exemplary a system. In the system illustrated in FIG. 7, the server may include a correlation DB. The information terminal 1B may include a signal detection unit 11. The signal detection unit 11 detects that the information terminal 1B is located outside a given area, for example a company, etc., and that a certain device held by the user, for example, the mobile device 5, etc., and the information terminal 1B are away from by a given distance or more based on the interruption signal. For example, the possibility that the information terminal 1B is left behind, and the HDD 2 is removed in an unauthorized way may be detected.

For example, the mobile device 5 obtains location information of the mobile device 5 itself, for example, first location information and a value detected by an acceleration sensor, for example, a first acceleration sensor value using a Global Positioning System (GPS) function. By the wireless communication unit using WiFi (registered trademark), or 3rd Generation Partnership Project (3GPP), or a Personal Handy-phone System (PHS) function, etc., the first location information and the first acceleration sensor value are transmitted to the server 4B of the company to which the mobile device 5 belongs.

If the information terminal 1B is able to access the server 4B through communication by a wireless communication unit using WiFi (registered trademark), or 3GPP, or a PHS function, etc., a determination may be made that the information terminal 1B is located in the company. The information terminal 1B obtains a value detected by the acceleration sensor, for example, a second acceleration sensor value. By the wireless communication unit using WiFi (registered trademark), or 3GPP, or a PHS function, etc., second location information and a second acceleration sensor value of the information terminal 1B are transmitted to the server 4B.

The server 4B receives the first location information and the first acceleration sensor value that are transmitted from the mobile device 5, and the second location information and the second acceleration sensor value that are transmitted from the information terminal 1B. The server 4B refers to a correlation DB 31B, which is included in the server 4B, and stores left-behind information of the information terminal 1B, and detects the possibility that the HDD 2 is removed in an unauthorized way.

For example, the server 4B calculates the distance between the mobile device 5 and the information terminal 1B based on the first location information and the second location information. The distance may include information of whether the mobile device 5 and the information terminal 1B are away by a given value or more. When the correlation DB 31B is referred to and it is detected that the mobile device 5, etc., is not located in a given area, for example, in a company, etc., and the distance between the mobile device 5 and the information terminal 1B is a given value or more, the possibility that the HDD 2 is removed in an unauthorized way may be detected.

The server 4B calculates, based on the first acceleration sensor value, an amount of change in the mobile device 5, for example, a movement path, and calculates an amount of change in the information terminal 1B based on the second acceleration sensor value. When these amounts of change are substantially the same, it may be estimated that the user carries around the mobile device 5 and the information terminal 1B. When the correlation DB 31B is referred to and it is detected that the mobile device 5, etc., is not located in a given area, for example, in a company, etc., and the distance between the mobile device 5 and the information terminal 1B is a given value or more, it may be detected that the HDD 2 is removed in an unauthorized way.

Figure 8:
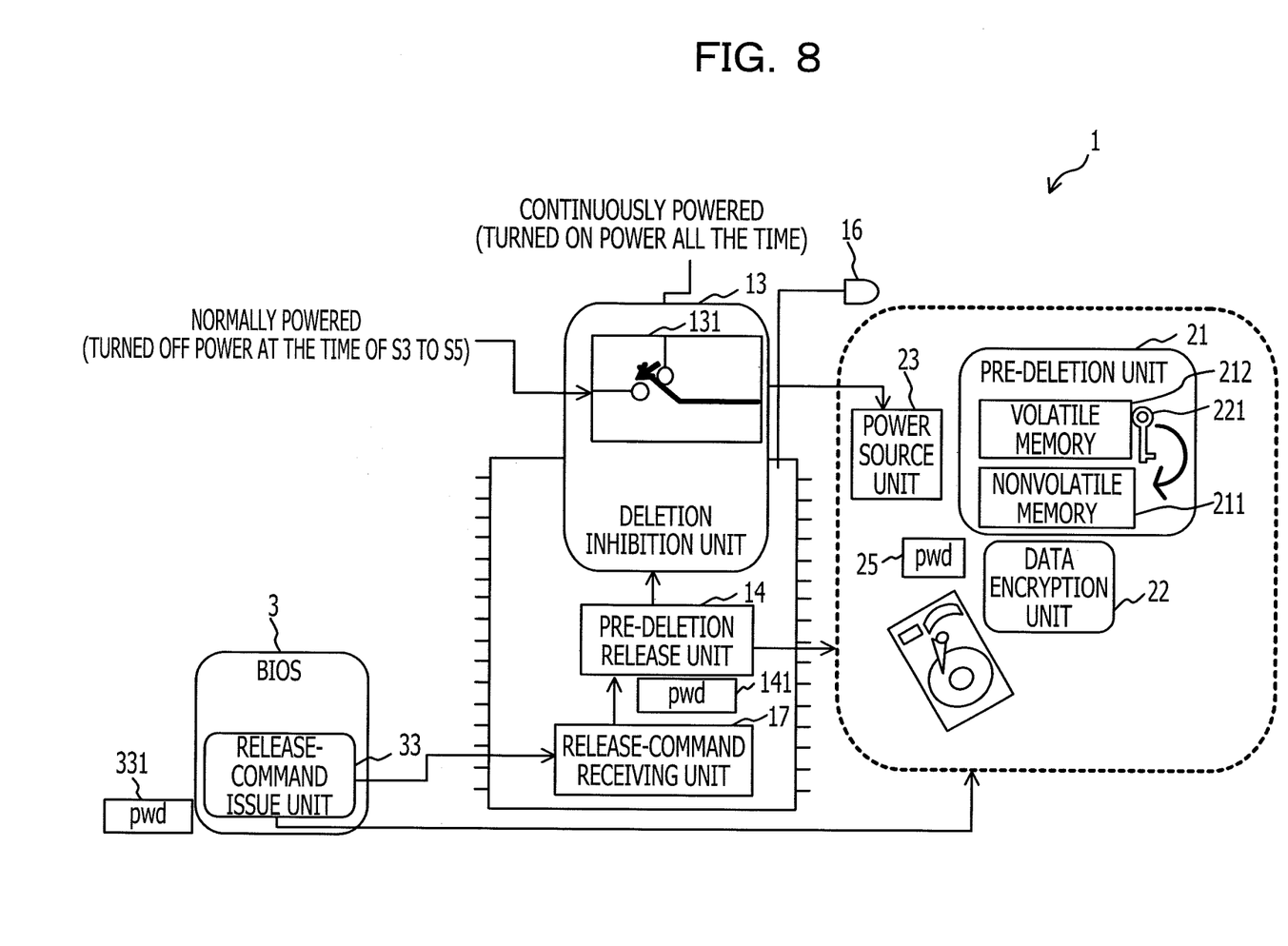
FIG. 8 illustrates an exemplary information terminal.

FIG. 8 illustrates an exemplary information terminal. The information terminal illustrated in FIG. 8 may include a pre-deletion release function. The information terminal 1 illustrated in FIG. 8 includes a pre-deletion release unit 14, a release-command receiving unit 17, and a release-command issue unit 33.

The release-command issue unit 33 included in the BIOS 3 issues a release command for releasing the pre-deletion state based on an instruction from the user. The release-command receiving unit 17 receives the release command, and controls the pre-deletion release unit 14 to release the pre-deletion state of the HDD 2. The pre-deletion unit 21 moves the encryption key 221 from the volatile memory 212 of the HDD 2 to the nonvolatile memory 211 in order to release the pre-deletion state of the HDD 2 based on the instruction from the pre-deletion release unit 14. The changeover SW 131 changes from a continuously powered state to a normally powered state based on the instruction of the pre-deletion release unit 14.

When the user replaces a main battery, the encryption key 221 may not be deleted. In the pre-deletion state, the encryption key 221 may not be read out because of the movement of the encryption key 221 from the nonvolatile memory 212 to the volatile memory 211 and the shut-off of the power supply to the HDD 2. For example, data in the volatile memory 211 may be forcibly deleted when the power to the HDD 2 is shut off using power of the capacitor included in the HDD 2 without moving the encryption key from the nonvolatile memory 212 to the volatile memory 211, for example, with keeping the encryption key in the nonvolatile memory 212.

The above-described process may be executed by hardware, firmware on a DSP (Digital Signal Processor) board or a CPU board, or software.

The above-described process may be executed on a single apparatus, a system including a plurality of apparatuses, an integrated apparatus, or a system performing process through a network, such as a LAN, a WAN, etc., for example.

The above-described process may be executed by a system including a CPU, a memory, such as a ROM or a RAM, an input device, an output device, an external recording apparatus, a medium drive, and a network connection device which are coupled each other via a bus. For example, a computer of the information terminal may read a program from the memory, such as the ROM or the RAM, etc., which records the software program, an external recording apparatus, or a removable recording medium, and may execute the program.

The above-described process may be executed by the program read out from the removable recording medium, etc.

The removable recording medium for supplying the program may include, for example, a flexible disk, a hard disk, an optical disc, a magneto-optical disc, a CD-ROM, a CD-R, a DVD-ROM, a DVD-RAM, a magnetic tape, a nonvolatile memory card, a ROM card, a recording medium on which data is recorded through a network-connection apparatus (communication line), such as an electronic mail, personal computer communications, etc., for example.

The above-described process may be performed by the execution of the program on the memory by the computer. The OS, etc., which runs on the computer, may perform a part of or all of the above-described process based on the instructions of the program.

The program read from the removable recording medium or the program (data) provided from a program (data) provider is written into a memory included in a function extension board mounted on a computer or a function extension unit coupled with the computer. The CPU, etc., included in the function extension board or the function extension unit may execute a part of or all of the above-described process based on the instructions of the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information terminal comprising:
   a storage storing information; and
   at least one processor connected with the storage, to
      encrypt the information and decrypt the encrypted information using an encryption key,
      detect an interruption signal based on a position of the information terminal and a distance between the information terminal and a device,
      issue an instruction, to the storage, to delete the encryption key in response to detection of the interruption signal,
      report issuance of the instruction, and
      stop deletion of the encryption key by cancelling the instruction based on a response to the report issuance,
   wherein the storage includes a nonvolatile storage area and a volatile storage area, and the processor moves the encryption key from the nonvolatile storage area to the volatile storage area based on the instruction in a state where a power-supplying state of the storage is changed from a first power-supplying state to a second power-supplying state having a greater power supply capability than the first power-supplying state.

2. The information terminal according to claim 1, wherein the processor detects the interruption signal based on opening of a case of the information terminal.

3. The information terminal according to claim 1, wherein the processor detects the interruption signal based on removal of a power source included in the information terminal.

4. The information terminal according to claim 1, wherein the processor detects the interruption signal based on the position where the information terminal locates outside a given area and the distance which is greater than or equal to a given distance.

5. The information terminal according to claim 1, wherein the interruption signal is detected based on a determination table.

6. The information terminal according to claim 1, wherein the information terminal includes a changeover switch to change from a first-power-supplying state to a second-power-supplying state.

7. The information terminal according to claim 1, wherein the encryption key is returned, from the volatile storage area to the nonvolatile storage area, when the instruction is cancelled.

8. A method of reducing information leakage, comprising:
   executing, by a computer of an information terminal including a storage, operations of:
      encrypting the information and storing the information into the storage;
      decrypting the encrypted information using an encryption key;
      detecting an interruption signal based on a position of the information terminal and a distance between the information terminal and a device;

setting the storage to a pre-deletion state based on detection of the interruption signal;

reporting the setting of the pre-deletion state to another device; and releasing the pre-deletion state of the storage based on a response to the reporting, wherein the storage includes a nonvolatile storage area and a volatile storage area, and the encryption key is moved from the nonvolatile storage area to the volatile storage area based on the detection in a state where a power-supplying state of the storage is changed from a first power-supplying state to a second power-supplying state having a greater power supply capability than the first power-supplying state.

9. The method according to claim 8, wherein the detection is performed by one of the interruption signal based on opening of a case of the information terminal, the interruption signal based on removal of a main power unit included in the information terminal.

10. The method according to claim 8, wherein the detection is performed by the interruption signal based on a position where the information terminal locates outside a given area and a distance which is greater than or equal to, a given distance.

11. The method according to claim 8, wherein the interruption signal is detected based on a determination table.

12. The method according to claim 8, wherein a first-power-supplying state is changed to a second-power-supplying state based on the stop signal.

13. The method according to claim 8, comprising, returning the encryption key from the volatile storage area to the nonvolatile storage area based on the response.

14. The method according to claim 8, wherein the another device is a server connected with the information terminal.

15. A non-transitory computer-readable medium storing a program which causes a processor of an information terminal including a storage to execute a process comprising:

encrypting information and storing the information into the storage;

decrypting the encrypted information using an encryption key;

setting the storage having the encryption key to a pre-deletion state based on detection of an interruption signal;

reporting the setting of the pre-deletion state to another device; and releasing the pre-deletion state of the storage based on a response to the reporting, wherein the encryption key is moved from a nonvolatile storage area to a volatile storage area of the storage based on the detection when a power-supplying state of the storage is changed from a first power-supplying state to a second power-supplying state having a greater power supply capability than the first power-supplying state, wherein the processor detects the interruption signal based on a position of the information terminal and a distance between the information terminal and a device.

* * * * *